US010915260B1

United States Patent
Lei et al.

(10) Patent No.: US 10,915,260 B1
(45) Date of Patent: Feb. 9, 2021

(54) DUAL-MODE DEDUPLICATION BASED ON BACKUP HISTORY

(71) Applicant: Veritas Technologies LLC, Mountain View, CA (US)

(72) Inventors: Chao Lei, Beijing (CN); Hui Yuan, Beijing (CN); Qing Fu Dong, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 244 days.

(21) Appl. No.: 15/964,309

(22) Filed: Apr. 27, 2018

(51) Int. Cl.
*G06F 3/06* (2006.01)
*G06F 16/907* (2019.01)
*G06F 12/0893* (2016.01)
*G06F 16/13* (2019.01)
*G06F 16/174* (2019.01)

(52) U.S. Cl.
CPC .......... *G06F 3/0641* (2013.01); *G06F 3/0608* (2013.01); *G06F 12/0893* (2013.01); *G06F 16/137* (2019.01); *G06F 16/1748* (2019.01); *G06F 16/907* (2019.01)

(58) Field of Classification Search
CPC .... G06F 3/0641; G06F 3/067; G06F 11/1453; G06F 3/065; G06F 3/0608; G06F 3/0619; G06F 16/1748; G06F 2201/84; G06F 11/1469
See application file for complete search history.

(56) References Cited

U.S. PATENT DOCUMENTS

| 9,465,808 B1* | 10/2016 | Karr .......................... G06F 3/06 |
| 2013/0073527 A1* | 3/2013 | Bromley ............. G06F 16/1748 707/692 |
| 2014/0101113 A1* | 4/2014 | Zhang ................. G06F 11/1453 707/692 |

\* cited by examiner

*Primary Examiner* — Yuk Ting Choi
(74) *Attorney, Agent, or Firm* — Campbell Stephenson LLP

(57) ABSTRACT

Disclosed herein are methods, systems, and processes to perform dual-mode deduplication based on backup history. A fingerprint of a data segment of a data stream is calculated and a determination is made as to whether the fingerprint of the data segment matches a corresponding fingerprint in a cache. If the fingerprint matches the corresponding fingerprint, another fingerprint of a subsequent data segment of the data stream is calculated. If the fingerprint does not match the corresponding fingerprint, a segment boundary of the data stream is calculated based on a hash value, a determination is made that a new fingerprint calculated based on the segment boundary does not match the corresponding fingerprint, segment boundaries and new fingerprints are calculated, and a determination is made that a first fingerprint matches another corresponding fingerprint in the cache.

16 Claims, 8 Drawing Sheets

DUAL-MODE DEDUPLICATION BASED ON BACKUP HISTORY

FIELD OF THE DISCLOSURE

This disclosure is related to deduplication backup computing systems. In particular, this disclosure is related to dual-mode deduplication based on backup history.

DESCRIPTION OF THE RELATED ART

Deduplication can be used to reduce storage space requirements for computing systems that maintain multiple copies of the same data. Instead of storing each copy of that data separately (such that n copies of an x-byte item would require n×x bytes of storage), a deduplication system only needs to store a single copy (thus, requiring only x bytes of storage). A deduplication system also maintains metadata that tracks the number of copies represented by a given item in a deduplicated storage area. During a backup, clients and/or computing systems can duplicate data within a set of data to be backed up. In addition, if a set of data is backed up multiple times, the data that is unchanged also results in duplicates of previously backed up data. In order to prevent backing up duplicate data from a client or multiple clients, backup systems can implement deduplication to remove duplicate copies of data. Therefore, deduplication preserves storage space when backing up data from client systems.

Existing deduplication backup systems typically perform deduplication on fixed-sized units of storage (e.g., blocks or fixed-size sets of blocks) or on variable-sized items of data such as files. Unfortunately, both methodologies exhibit their own shortcomings. Performing deduplication only on fixed-size units of storage may not deduplicate content that can be aligned differently within the fixed-sized units each time that content is repeated. On the other hand, performing deduplication on variable-sized items often requires an undesirable amount of processing overhead (e.g., to maintain metadata, and the like).

SUMMARY OF THE DISCLOSURE

Disclosed herein are methods, systems, and processes to perform dual-mode deduplication based on backup history. One such method involves calculating a fingerprint of a data segment of a data stream and determining whether the fingerprint of the data segment matches a corresponding fingerprint in a cache. If the fingerprint matches the corresponding fingerprint, the method involves calculating another fingerprint of a subsequent data segment of the data stream.

In certain embodiments, if the fingerprint does not match the corresponding fingerprint, the method involves calculating a segment boundary of the data stream based on a hash value, determining that a new fingerprint calculated based on the segment boundary does not match the corresponding fingerprint, calculating one or more segment boundaries and one or more new fingerprints based on the one or more segment boundaries, respectively, and determining that a first fingerprint of the one or more fingerprints matches another corresponding fingerprint in the cache.

In one embodiment, the method involves, based on the first fingerprint matching the another corresponding fingerprint, calculating another fingerprint of another data segment of the data stream that is adjacent to a first data segment in the data stream and corresponding to the first fingerprint, and retrieving data segment metadata associated with a backup image, where the backup image is maintained by a backup server, the backup image is a previous backup image, and the data segment metadata includes fingerprints and respective data segment lengths.

In another embodiment, the method involves performing a deduplication operation by deduplicating a plurality of data segments of the data stream. In this example, the deduplication operation is a dual-mode deduplication operation, a fast mode of the dual mode implements hashing of data in the data stream and a slow mode of the dual mode does not implement hashing of data, and calculating the another fingerprint of the subsequent data segment of the data stream if the fingerprint matches the corresponding fingerprint indicates the fast mode of the dual-mode deduplication operation.

In some embodiments, the method involves calculating segment boundaries until at least the first fingerprint matches the another corresponding fingerprint, and performing the deduplication operation includes switching between the fast mode of the dual-deduplication operation and the slow mode of the dual-mode deduplication operation, and vice-versa. In this example, the fast mode utilizes a segment length information from a previous backup image as a segment boundary to chunk a current data stream to compute one or more fingerprints of one or more segments.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
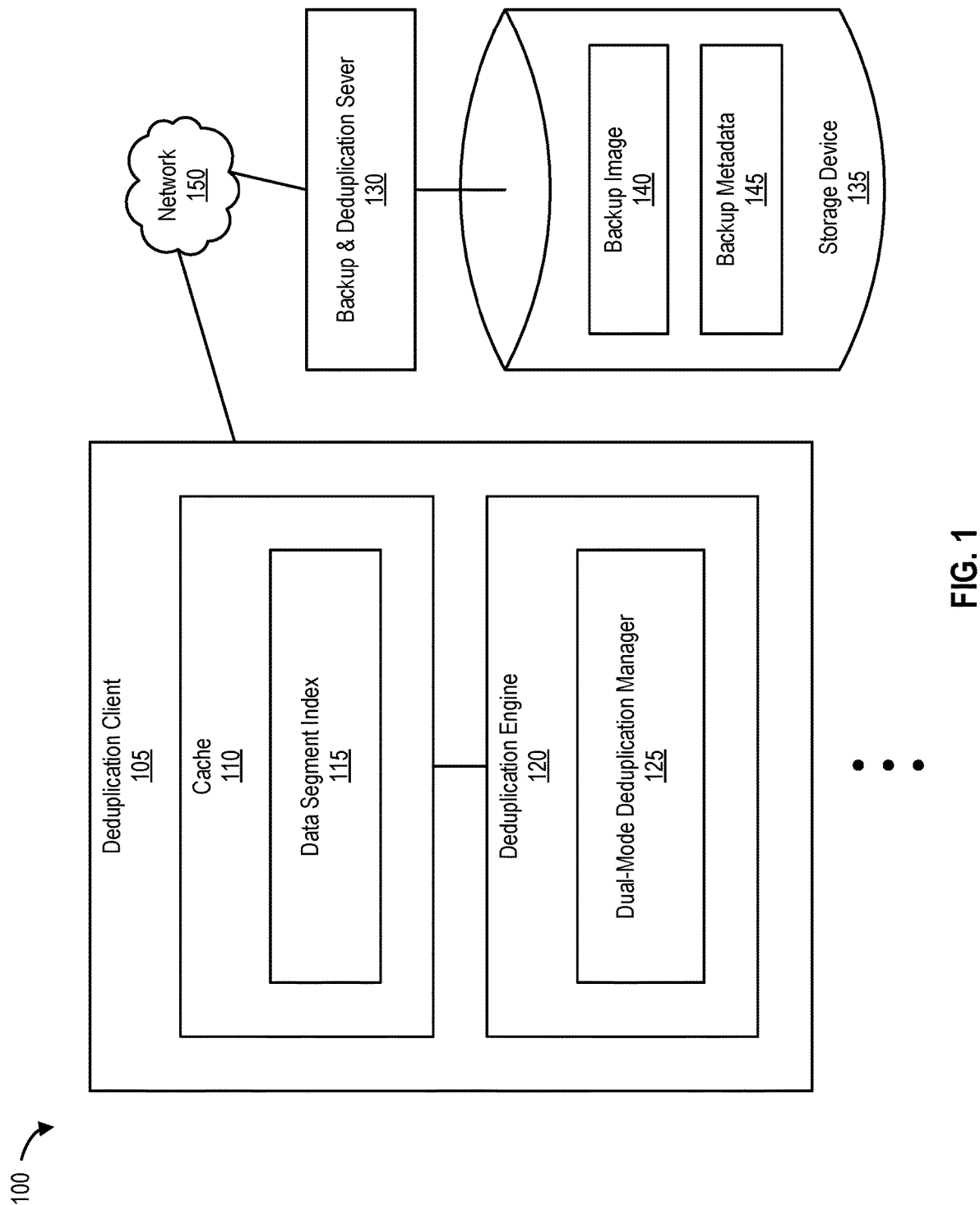
FIG. 1 is a block diagram 100 of a dual-mode deduplication system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Deduplication can be used to reduce storage space requirements for computing systems that maintain multiple copies of the same data. Instead of storing each copy of that data separately (such that n copies of an x-byte item would require n×x bytes of storage), a deduplication system only needs to store a single copy (requiring only x bytes of storage). A deduplication system also maintains metadata that tracks the number of copies represented by a given item in a deduplicated storage area.

During a backup, clients and/or computing systems can duplicate data within a set of data to be backed up. In addition, if a set of data is backed up multiple times, the data that is unchanged also results in duplicates of previously backed up data. In order to prevent backing up duplicate data from a client or multiple clients, backup systems can implement deduplication to remove duplicate copies of data. Therefore, deduplication preserves storage space when backing up data from client systems.

Existing deduplication backup systems typically perform deduplication on fixed-sized units of storage (e.g., blocks or fixed-size sets of blocks) or on variable-sized items of data such as files. Unfortunately, both methodologies have their own inefficiencies. Performing deduplication only on fixed-size units of storage may miss opportunities to deduplicate content that can be aligned differently within the fixed-sized units each time that content is repeated. On the other hand, performing deduplication on variable-sized items often requires an undesirable amount of overhead to maintain metadata, and the like.

For example, performing deduplication using a variable-length algorithm (versus a fixed-length algorithm) provides an advantageous deduplication ratio but a disadvantageous input/output (I/O) throughput. On the contrary, performing deduplication using fixed-length algorithm (versus a variable-length algorithm) provides an advantageous I/O throughput, but a disadvantageous deduplication ratio.

As noted, variable-length deduplication algorithms provide higher deduplication ratios at the cost of consuming significant Central Processing Unit (CPU) resources (e.g., to determine segment boundaries in backup streams). However, the backup I/O throughput is not necessarily (or always) better compared to performing deduplication using fixed-length algorithms, particularly when CPUs are not powerful enough. On the other hand, performing deduplication using fixed-length algorithms is less CPU intensive, but generally provides lower deduplication ratios.

Disclosed herein are methods, systems, and processes that configure, manage, and perform dual-mode deduplication using backup history to optimize the advantages of both variable-length and fixed-length deduplication techniques (e.g., maximizing deduplication ratio with a decrease in CPU cycles, and the like), while minimizing (or eliminating) their disadvantages.

Example Dual-Mode Deduplication System

FIG. 1 is a block diagram 100 of a dual-mode deduplication system, according to one embodiment. The dual-mode deduplication system of FIG. 1 utilizes data segment boundaries from historical backup images to accelerate a chunking process (e.g., splitting a file into smaller files called chunks) to improve the performance of variable-length deduplication techniques while minimizing the corresponding loss of deduplication ratios.

As shown in FIG. 1, a deduplication client 105 includes at least a cache 110 and a deduplication engine 120. Cache 110 includes at least a data segment index 115 and deduplication engine 120 includes at least a dual-mode deduplication manager 125. Deduplication client is communicatively coupled to a backup and deduplication server 130 via network 150. Backup and deduplication server 130 receives, manages, and stores backup data and/or deduplicated backup data in a storage device 135 (e.g., as one or more backup images like a backup image 140 along with corresponding metadata like backup metadata 145).

Network 150 can be any type of network or interconnection (e.g., the Internet, a Wide Area Network (WAN), and the like), and deduplication client 105 can each be any type of computing device (e.g., a desktop, a laptop, a mobile computing device such as a tablet or a smartphone, a server, and the like). Storage device 135 can include one or more of a variety of different storage devices, including hard drives, compact discs, digital versatile discs, solid state drive (SSD) memory such as Flash memory, and the like, or one or more logical storage devices such as volumes implemented on one or more such physical storage devices. Backup and deduplication server 130 and storage device 135 can be integrated or separate. If separate, Backup and deduplication server 130 and storage device 135 can be communicatively coupled by a network such as the Internet or a Storage Area Network (SAN).

Backup and deduplication server 130 maintains a recent backup image (e.g., a last full backup image like backup image 140). Backup metadata 145, stored by backup and deduplication server 130 in association with backup image 140, includes information and/or metadata regarding data segment boundaries of data in backup image 140 (e.g., fingerprint(s) of data segment(s) and data segment length(s) of data segment(s), and the like). Deduplication client 105 retrieves backup metadata 145 associated with backup image 140 from storage device 135 by sending a request for backup metadata 145 to backup and deduplication server 130. Upon receiving and/or retrieving backup metadata 145 from backup and deduplication server 130, deduplication client 105 stores backup metadata 145 in cache 110 (e.g., as data segment index 115 to be used to perform dual-mode deduplication).

Fingerprints may be used for deduplication purposes. Fingerprints can be used to avoid the comparison and transmission of bulky data. For example, deduplication engine 120 can check whether remotely stored data segment in backup image 140 has been modified by retrieving only the data segment's fingerprint (e.g., as part of backup metadata 145), and comparing the retrieved fingerprint with that of a corresponding data segment in a current backup data stream (also referred to herein as a data stream).

Therefore, a fingerprint is a value generated for a given data segment and such fingerprint values need to be substantially unique to each data segment, and thus distinguish data segments from one another.

In one embodiment, deduplication engine 120 compares one or more data segments of a data stream to metadata and/or information in data segment index 115 (which includes one or more parts of backup metadata 145 retrieved and/or received from backup and deduplication server 130) to determine data segment boundaries of the data stream such that deduplication engine 120 avoids the need to compute one or more sliding windows at every byte to determine data segment boundaries in the data stream, thus reducing chunking operations and CPU overhead associated with variable-length deduplication algorithms (e.g., if the sliding window for the data stream is 8 bytes, a hashing function uses 8 bytes to compute the hash value from the first byte to the end of the data stream).

Sliding windows, employed by variable-length deduplication techniques, involve the utilization of rolling hashes (also known as recursive hashing or rolling checksum). A rolling hash is a hash function (e.g., a function that can be used to map data of arbitrary size to data of fixed size), where input is hashed in a sliding window that moves through the input (e.g., through data segments of a data stream that is being deduplicated). A new hash value can be calculated using an old hash value. The old hash value is removed from the sliding window and the new hash value is added to the sliding window.

Therefore, deduplication engine 120 performs at least two separate and/or independent functions with respect to dual-mode deduplication. First, when performing deduplication on a data stream using a fixed-length methodology, deduplication engine 120 computes fingerprints of data segments in a data stream (that is being deduplicated or is selected for deduplication by deduplication client 105) and compares the computed fingerprints to fingerprints of data segments in a last backup image (e.g., backup image 140) received and/or retrieved by deduplication client 105 from backup and deduplication server 130 in the form of one or more parts of backup metadata 145 and stored in cache 110 as data segment index 115. Second, when performing deduplication on the same data stream using a variable-length methodology, deduplication engine 120 computes data segment boundaries of modified data segments (e.g., as the result of added data or deleted data) using hash values (e.g., using a hashing function of the variable-length methodology).

However, in certain embodiments, regardless of whether deduplication engine 120 computes fingerprints for data segment comparison while performing fixed-length deduplication or whether deduplication computes hash values to determine (new) data segment boundaries while performing variable-length deduplication, deduplication engine 120 can use and/or implement one or more of a variety of fingerprint algorithms and/or hashing algorithms such as such as Rabin's Algorithm, Message-Digest Algorithm 5 (MD5), Secure Hash Algorithm 1 (SHA-1), and Secure Hash Algorithm 256 (SHA-256), and the like.

Therefore, because deduplication engine 120 has access to historical backup information that contains data segment boundary information (e.g., backup metadata 145 in the form of data segment index 115), deduplication engine 120 uses the historical backup information as a comparison mechanism to determine data segment boundaries, avoiding (or minimizing) the need to compute sliding windows at every byte to determine data segment boundaries in the data stream (being deduplicated), while at the same time significantly reducing the need for processing-intensive chunking operations (which are required in variable-length deduplication methodologies).

Example Cache with Historical Backup Data

Figure 2:
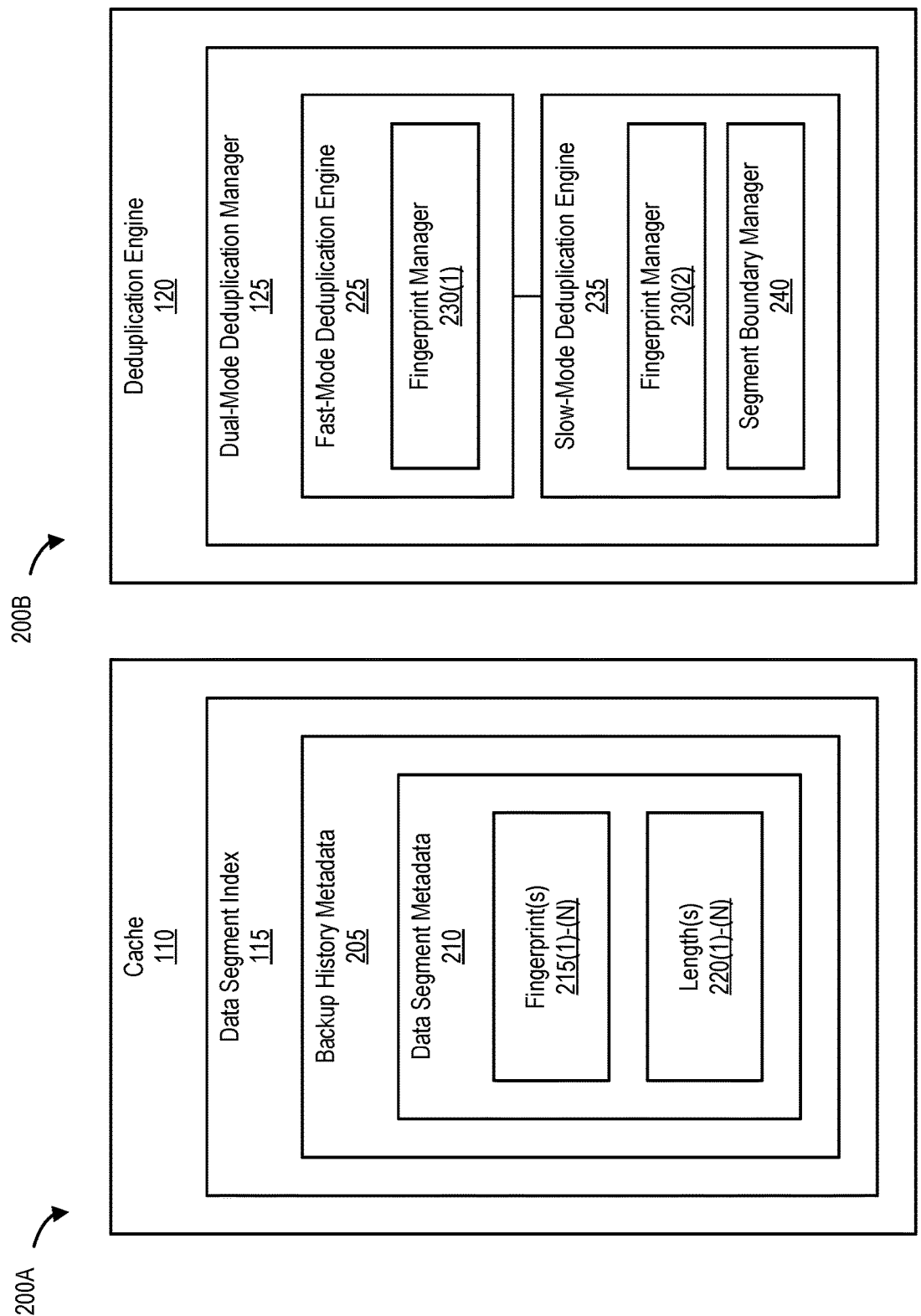
FIG. 2A is a block diagram 200A of a client-side cache, according to one embodiment of the present disclosure.
FIG. 2B is a block diagram 200B of a deduplication engine, according to one embodiment of the present disclosure.

FIG. 2A is a block diagram 200A of a client-side cache, according to one embodiment. Cache 110 includes at least data segment index 115. Data segment index 115 includes at least backup history metadata 205. Backup history metadata 205 includes at least data segment metadata 210. Data segment metadata 210 includes at least fingerprint(s) 215(1)-(N) and (data segment) length(s) 220(1)-(N). As noted, backup history metadata 205 is retrieved from backup and deduplication server 130 by deduplication client 105 and includes one or more parts of backup metadata 145.

In one embodiment, data segment metadata 210 includes a data segment layout of a last full backup image (e.g., backup image 140) with at least the identity of data segments in the last full backup image, fingerprints of the data segments (e.g., fingerprints 215(1)-(N)), and the length of the data segments (e.g., lengths 220(1)-(N).

Deduplication client 105 retrieves data segment metadata 210 associated with backup image 140 maintained by backup and deduplication server 130. In this example, backup image 140 is maintained by backup and deduplication server 130, backup image 140 is a previous backup image (e.g., a last full backup image), and data segment metadata 210 includes at least one or more corresponding fingerprints and one or more data segment lengths (e.g., fingerprints 215(1)-(N) and lengths 220(1)-(N), respectively). Therefore, deduplication client 105 can create a data segment layout of historical backup information as data segment index 115 for dual-mode deduplication purposes.

Example Dual-Mode Deduplication Engine

FIG. 2B is a block diagram 200B of a deduplication engine, according to one embodiment. Deduplication 120 includes at least a dual-mode deduplication manager 125. Dual-mode deduplication manager 125 includes at least a fast-mode deduplication engine 225 with at least a fingerprint manager 230(1) and a slow-mode deduplication engine 235 with at least a fingerprint manager 230(2) and a segment boundary manager 240 (e.g., for determining new segment boundaries using rolling hashes upon the detection of a modified and/or changed data segment in the data stream being deduplicated).

In one embodiment, dual-mode deduplication manager 125 performs a (dual-mode) deduplication operation by deduplicating multiple data segments of a data stream (e.g., a current data stream for deduplication and/or backup generated by deduplication client 105 and intended for backup and deduplication server 130). Fast-mode deduplication engine 225 calculates a fingerprint of a (first) data segment of a data stream using fingerprint manager 230(1), and determines whether the fingerprint matches a corresponding fingerprint of the data segment (e.g., fingerprint 215(1)) in cache 110. If the fingerprint matches the corresponding fingerprint, fingerprint manager 230(1) calculates another fingerprint of a subsequent data segment of the data stream. However, if the fingerprint does not match the corresponding fingerprint, dual-mode deduplication manager 125 switches the management of the dual-mode deduplication operation from fast-mode deduplication engine 225 to slow-mode deduplication engine 235.

Therefore, if the fingerprint does not match the corresponding fingerprint, fingerprint manager 230(2) determines that the fingerprint does not match the corresponding fingerprint because the data segment in question is a modified and/or changed data segment (e.g., because of the addition of data or the deletion of data in the data segment that has caused a change in the data segment boundary and/or size of the data segment and thus a fingerprint cache miss). In this scenario, control is passed from fast-mode deduplication engine 225 to slow-mode deduplication engine 235 and segment boundary manager 240 calculates a (new) segment boundary of the data segment (e.g., based on a rolling hash value). Fingerprint manager 230(2) then determines that the new fingerprint of the data segment calculated based on the (new) segment boundary does not match the corresponding fingerprint. Finally, segment boundary manager 240 calculates one or more segment boundaries of one or more subsequent data segments and fingerprint manager 230(2) calculates one or more new fingerprints of the one or more subsequent data segments (with new segment boundaries), until at least one fingerprint of one subsequent data segment matches another corresponding fingerprint in cache 110 (e.g., at least one of 215(3)-(N)).

Therefore, because a cache hit has now been established by deduplication engine 120, management (and performance) of the dual-mode deduplication operation now passes or switches from slow-mode deduplication engine 235 to fast-mode deduplication manager 225. Based on the at least one fingerprint matching the another corresponding fingerprint, fingerprint manager 230(1) calculates another fingerprint of another data segment of the data stream that is adjacent to the at least one subsequent data segment in the data stream that matches the another corresponding fingerprint.

In one embodiment, a fast-mode of the dual-mode deduplication operation is indicated by the calculation of another fingerprint of the subsequent data segment of the data stream (e.g., if the fingerprint matches the corresponding fingerprint). In another embodiment, a slow-mode of the dual-mode deduplication operation is indicated by the calculation of segment boundaries and fingerprints until at least the one fingerprint of the one subsequent data segment matches the another corresponding fingerprint included in cache 110 (e.g., if the fingerprint does not match the corresponding fingerprint).

In certain embodiments, performing the dual-mode deduplication operation involves switching between fast-mode deduplication engine 225 (e.g., for fixed-length deduplication upon cache hit) and slow-mode deduplication engine 235 (e.g., for variable-length deduplication upon cache miss and for (new) segment boundary calculation), and vice-versa.

Example Dual-Mode Deduplication Operation

Figure 3:
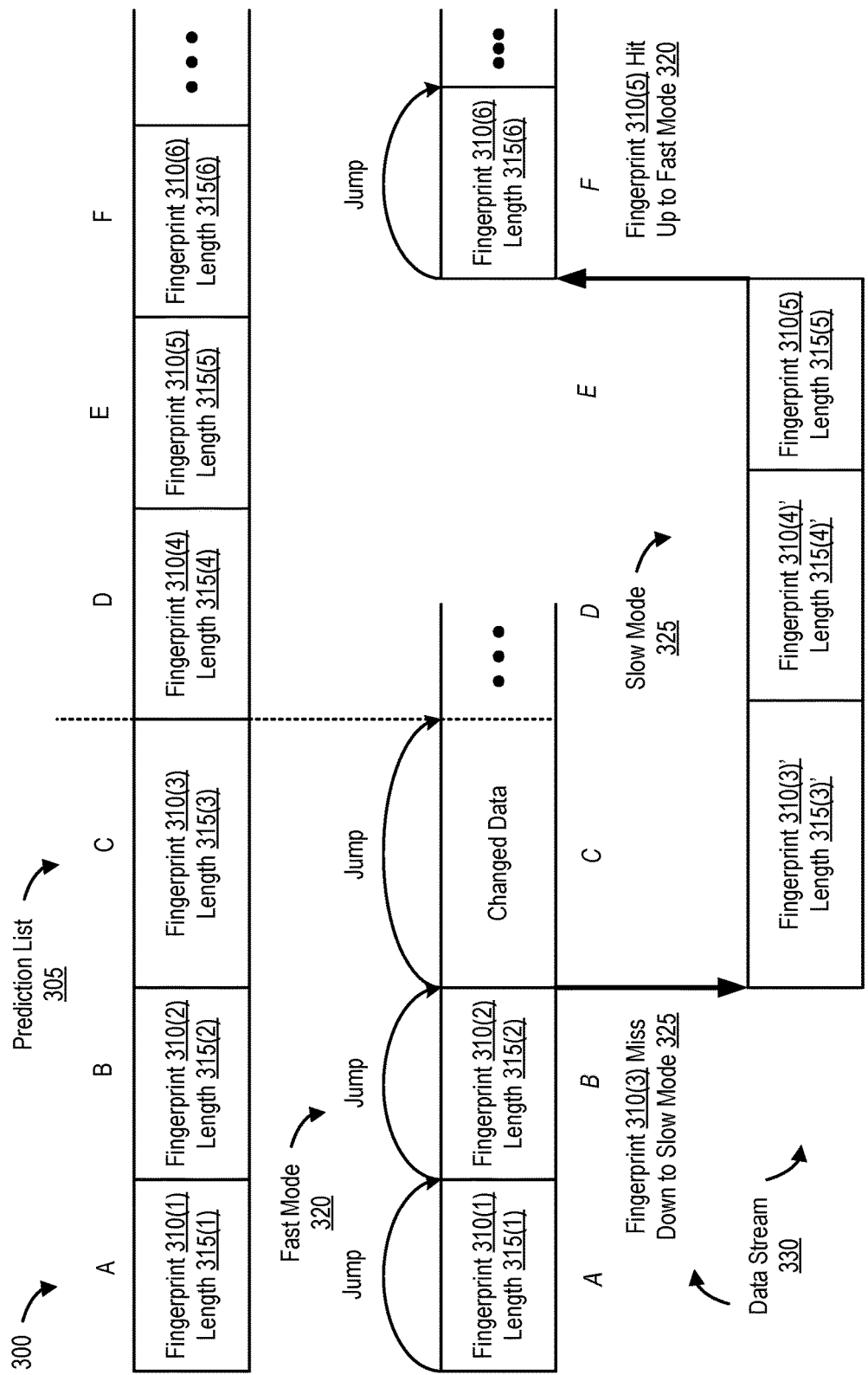
FIG. 3 is a block diagram 300 of a dual-mode deduplication operation, according to one embodiment of the present disclosure.

FIG. 3 is a block diagram 300 of a dual-mode deduplication operation, according to one embodiment. As shown in FIG. 3, prediction list 305 (e.g., data segment metadata 210 associated with a last backup image such as backup image 140) includes fingerprints 310(1)-(6) and (corresponding) lengths 315(1)-(6). Fast-mode deduplication is identified as fast mode 320 and slow mode deduplication is identified as slow mode 325. The data stream being deduplicated in dual-mode is identified as data stream 330.

In fast mode 320, fast-mode deduplication engine 225 performs deduplication by performing chunking (e.g., determining data boundaries) using segment layout information of a previous backup image (e.g., prediction list 305). In slow mode 325, slow-mode deduplication engine 235 performs deduplication by performing chunking with a rolling hash of sliding windows (as described above). The chunking process of data stream 330 is changed or switched back and forth between fast mode 320 and slow mode 325, and vice-versa, triggered by fingerprint hit (up to fast mode 320) or miss (down to slow mode 325).

For example, deduplication client 105 fetches data segment information (e.g., <fingerprint, length> of backup image 140 on backup and deduplication server 130 and stores the data segment information as an ordered list (e.g., prediction list 305) in cache 110. Dual-mode deduplication manager 125 enters fast mode 320 using fast-mode deduplication engine 235 and sets data segment index 115 to point to <fingerprint 310(1), length 315(1)> in cache 110 (e.g., fingerprint and length of data segment A). Fast-mode deduplication engine 235 then chunks data stream 330 with the length of data segment A (e.g., length 315(1)) and gets a cache hit (e.g., the fingerprints match).

Fast-mode deduplication engine 235 then moves data segment index 115 to the next data segment in cache 110 (e.g., data segment B). Fast-mode deduplication engine 235 moves forward in data stream 330, chunks data stream 330 with length of data segment B (e.g., length 315(2)), and receives a cache hit. Fast-mode deduplication engine 235 next moves data segment index 115 to data segment C in cache 110 and chunks data stream 330 with the length of data segment C (e.g., length 315(3)). When checked against cache 110, dual-mode deduplication manager 125 now gets a cache miss.

Dual-mode deduplication manager 125 now switches to slow mode 325 by switching the management and performance of future deduplication operations from fast-mode deduplication engine 225 to slow-mode deduplication engine 235. Segment boundary manager 240 computes the (new) segment boundary of data segment C with a rolling hash, computes the (new) fingerprint of data segment C (e.g., 310(3)'), and checks the fingerprint against client cache (e.g., cache 110). Slow-mode deduplication engine 235 receives a cache miss and determines that a new data segment is found (e.g., with (new) length 315(3)'). Slow-mode deduplication engine 235 continues performing deduplication in slow mode. For data segment E, slow-mode deduplication engine 235 checks the fingerprint of data segment E against cache 110 and receives a cache hit.

Dual-mode deduplication manager 125 now switches to fast mode 320 by switching the management and performance of future deduplication operations from slow-mode deduplication engine 235 to fast-mode deduplication engine 225. Fast-mode deduplication engine 225 sets data segment index 115 to the next data segment immediate following, adjacent to, and/or subsequent to data segment E, which is data segment F. Fast-mode deduplication engine 225 continues performing deduplication in fast mode 320 by chunking data segment F in fast (e.g., with the same logic as data segments A and B, discussed above). In this manner, dual-mode deduplication manager 125 continues chunking, switching back and forth between fast mode 320 and slow mode 325, and vice-versa. A cache miss switches the dual-mode deduplication operation to slow mode 325, where as a cache hit switches the dual-mode deduplication operation to fast mode 320.

In this manner, dual-mode deduplication manager 125 only requires rolling hashes for one or more new/modified/changed data segment(s) (e.g., data segment D as shown in FIG. 3) and one duplicate data segment (e.g., only a single duplicated data segment E as shown in FIG. 3), avoiding processing-intensive computing efforts for other duplicate data segments (e.g., rolling hashes in variable-length/slow mode are only required for one (a single) duplicate data segment per switch down from fast mode to slow mode). It should be noted that existing deduplication methodologies cannot perform chunking as they exclusively use fixed-length algorithms, or if they employ variable-length algorithms, they do not leverage segment layout information from previous backup images.

Therefore, the foregoing methods and systems configure, manage, and perform dual-mode deduplication using backup history to optimize the advantages of both variable-length and fixed-length deduplication techniques (e.g., maximizing deduplication ratio with a decrease in CPU cycles, and the like), while minimizing (or eliminating) their disadvantages.

Example Processes for Performing Dual-Mode Deduplication

Figure 4:
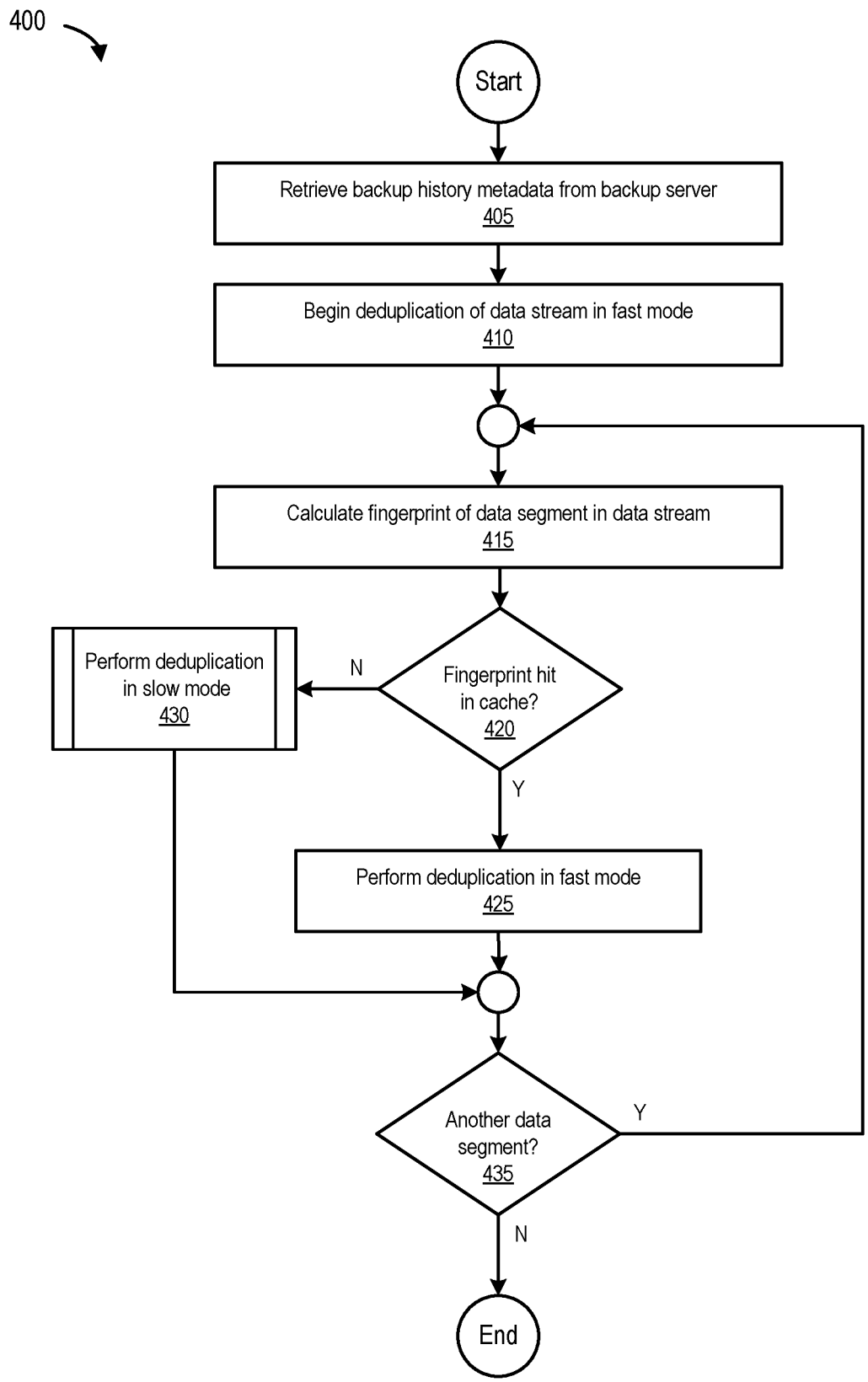
FIG. 4 is a flowchart 400 of a process for performing dual-mode deduplication operations, according to one embodiment of the present disclosure.

FIG. 4 is a flowchart 400 of a process for performing dual-mode deduplication operations, according to one embodiment. The process begins at 405 by receiving backup history metadata from a backup server (e.g., data segment metadata 210 from backup and deduplication server 130). At 410, the process begins deduplication of a data stream in fast mode (e.g., data stream 330 in fast mode 320 as shown in FIG. 3). At 415, the process calculates the fingerprint of the data segment in the data stream (e.g., data segment A), and at 420, determines if there is a fingerprint hit in cache (e.g., in prediction list 305 maintained in cache 110). If there is no fingerprint hit in cache, the process, at 430, performs deduplication in slow mode (e.g., moves/drops down to slow mode 325 from fast mode 320 with respect to data segment C as shown in FIG. 3). However, if there is a fingerprint hit in cache, the process, at 425, performs (e.g., continues to perform) deduplication in fast mode (e.g., with respect to data segment B as shown in FIG. 3). At 435, the process determines if there is another data segment. If there is another data segment, the process loops to 415. Otherwise, the process ends.

Figure 5:
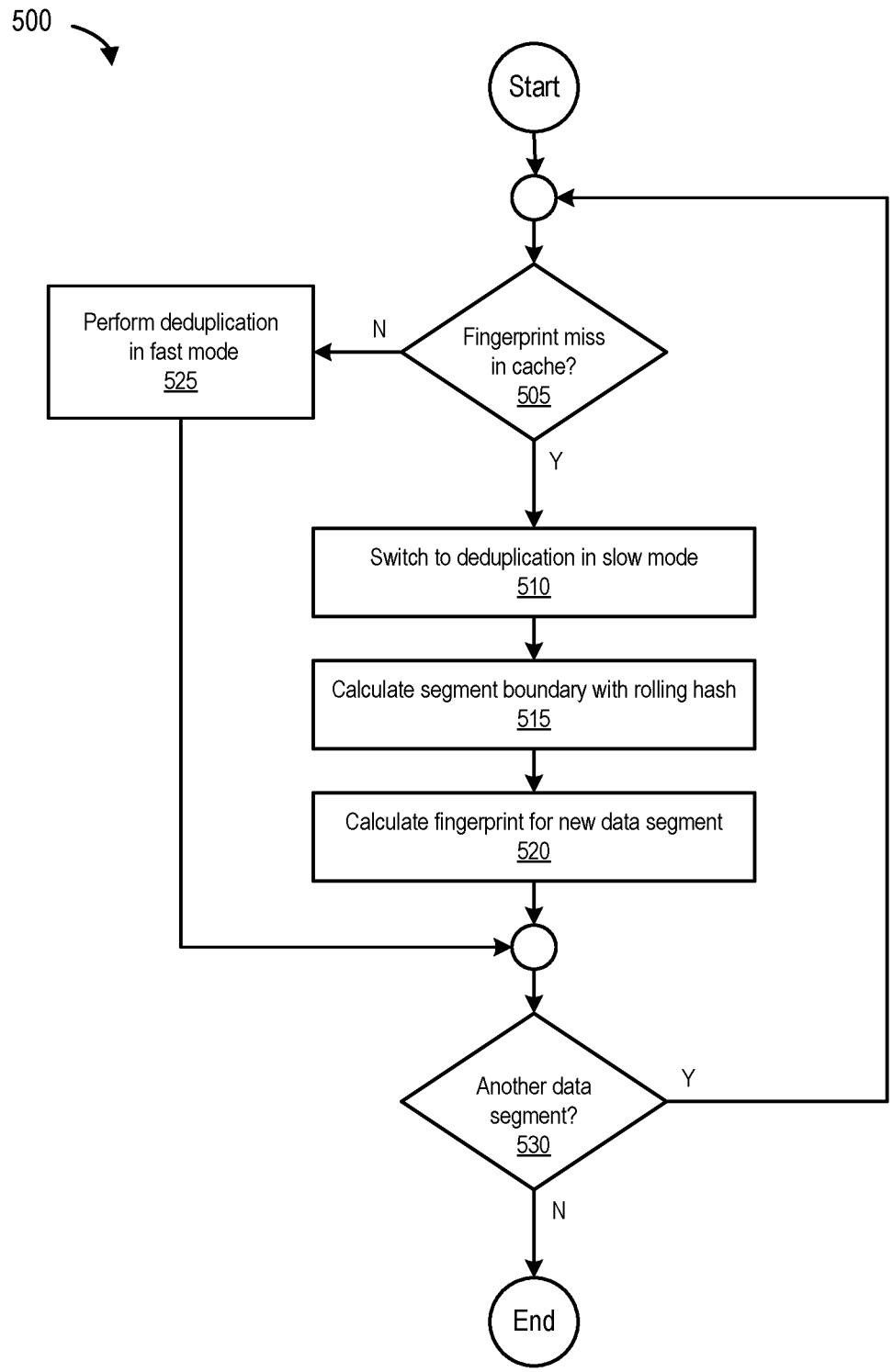
FIG. 5 is a flowchart 500 of a process for switching deduplication modes, according to one embodiment of the present disclosure.

FIG. 5 is a flowchart 500 of a process for switching deduplication modes, according to one embodiment. The process begins at 505 by determining if there is a fingerprint miss in cache. If there is no fingerprint miss in cache, the process, at 525, performs deduplication in fast mode. However, if there is a fingerprint miss in cache, the process, at 510, switches to deduplication in slow mode (e.g., (moves/drops down to slow mode 325 from fast mode 320 with respect to data segment C as shown in FIG. 3). At 515, the process calculates one or more (new) segment boundaries with rolling hash (e.g., for changed data segment and one subsequent and/or adjacent duplicated data segment), and at 520, calculates (new) fingerprints for the (new) data segments (e.g., for changed data segment and one subsequent and/or adjacent duplicated data segment). At 530, the process determines if there is another data segment. If there is another data segment, the process loops to 505. Otherwise, the process ends.

Figure 6:
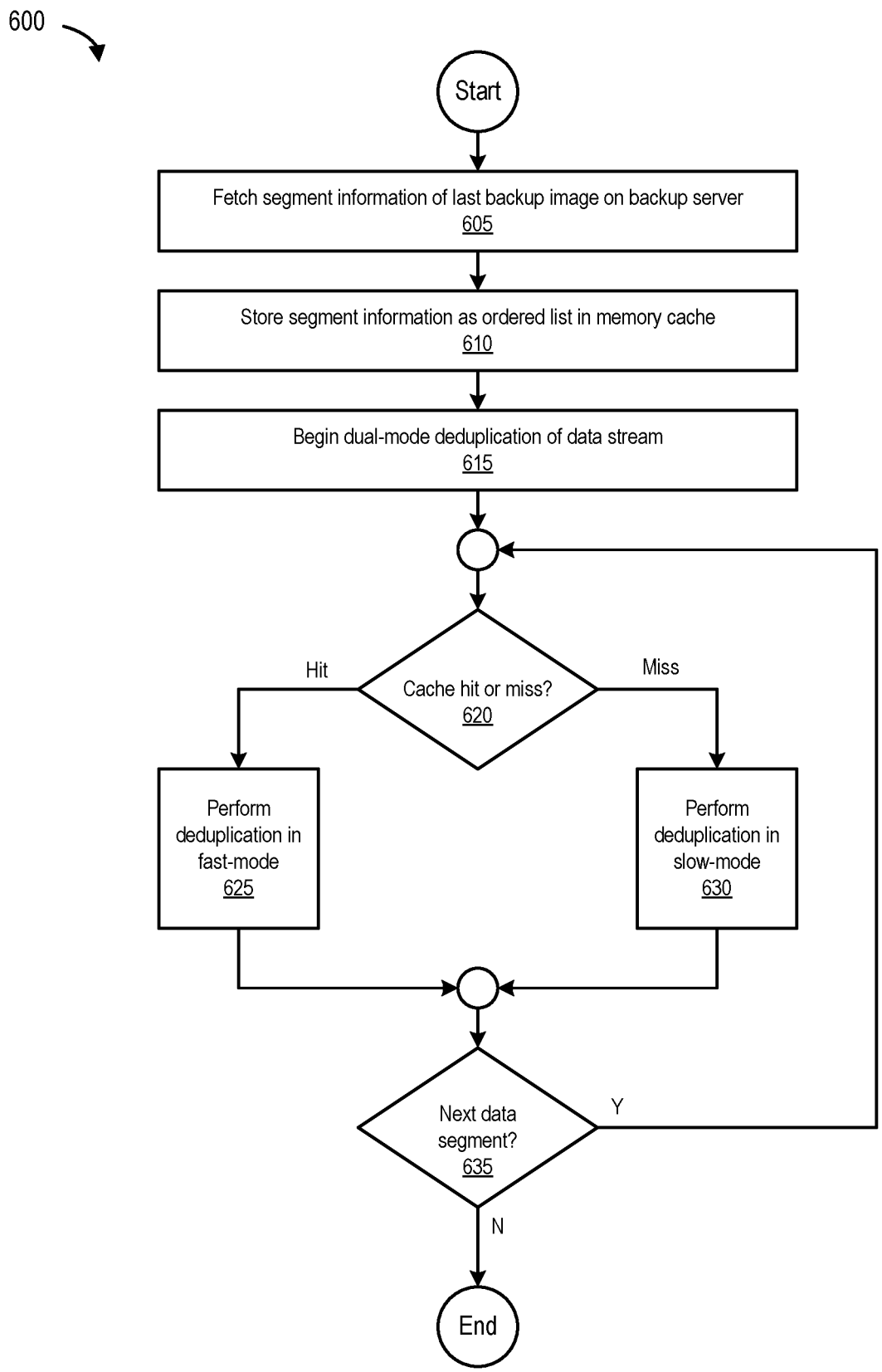
FIG. 6 is a flowchart 600 of a process for performing dual-mode deduplication based on backup history, according to one embodiment of the present disclosure.

FIG. 6 is a flowchart 600 of a process for performing dual-mode deduplication based on backup history, according to one embodiment. The process begins at 605 by fetching segment information of a last backup image from a backup server. At 610, the process stores the segment information as an ordered list in memory cache, and at 615, begins dual-mode deduplication of a data stream. At 620, the process determines if there is a cache hit or miss. If three is a cache hit, the process, at 630, performs deduplication in fast mode. If there is a cache miss, the process, at 630, performs deduplication in slow mode. At 635, the process determines if there a next data segment (e.g., a subsequent data segment to a data segment with a cache hit in fast mode (e.g., data segment A) like data segment B or a data segment adjacent to a duplicate data segment with a cache hit (e.g., data segment D) in slow mode like data segment E as shown in FIG. 3). If there is another data segment, the process loops to 620. Otherwise, the process ends.

Therefore, the foregoing processes configure, manage, and perform dual-mode deduplication using backup history to optimize the advantages of both variable-length and fixed-length deduplication techniques (e.g., maximizing deduplication ratio with a decrease in CPU cycles, and the like), while minimizing (or eliminating) their disadvantages.

Example Computing Environment

Figure 7:
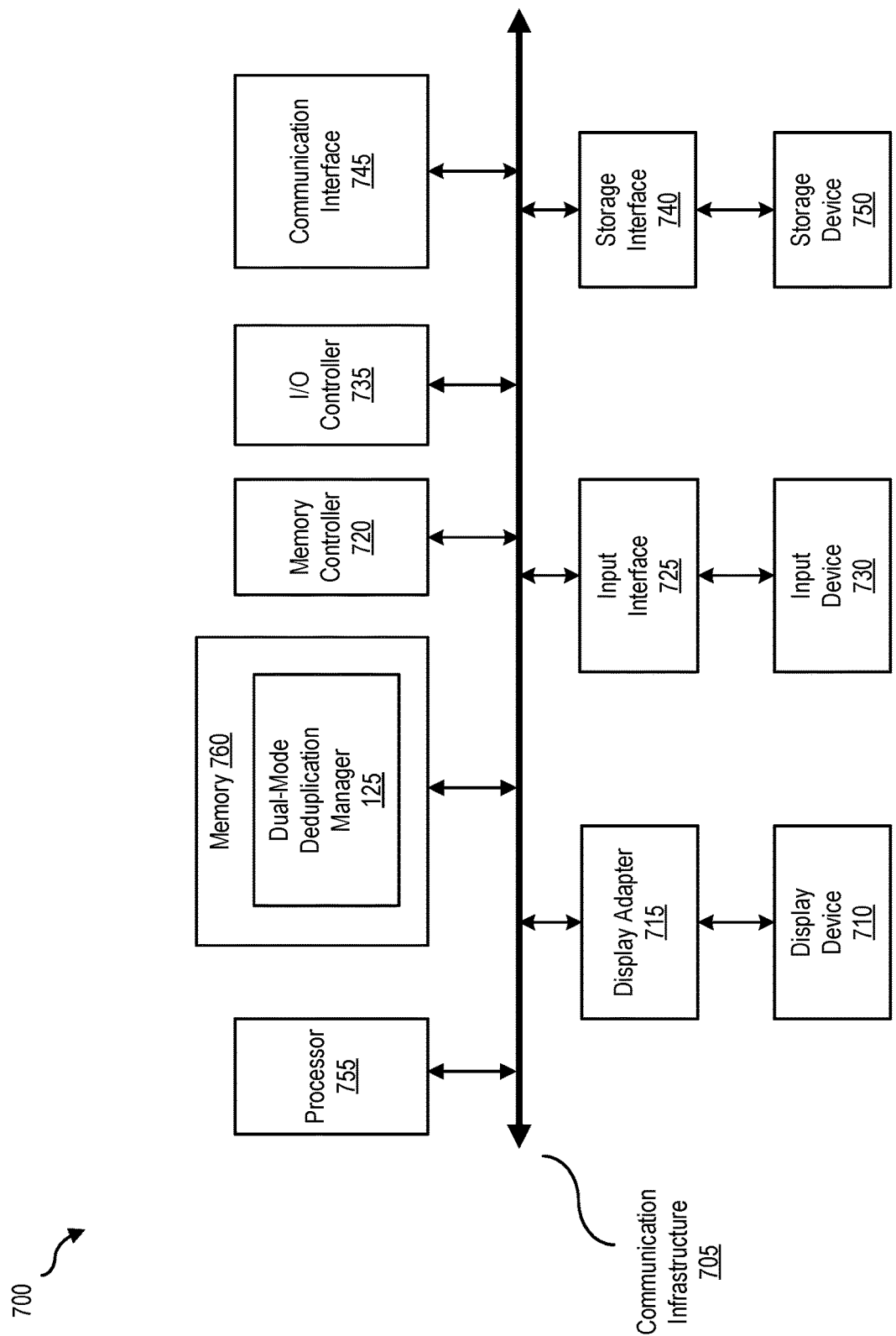
FIG. 7 is a block diagram of a computing device, illustrating how a deduplication engine can be implemented in software, according to one embodiment of the present disclosure.

FIG. 7 is a block diagram 700 of a computing system, according to one embodiment. FIG. 7 illustrates how dual-mode deduplication manager 125 can be implemented in software. Computing system 700 can include deduplication client 105 and broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 755 and a memory 760. By executing the software that executes dual-mode deduplication manager 125, computing system 700 becomes a special purpose computing device that is configured to facilitate and/or perform dual-mode deduplication using backup history.

Processor 755 generally represents any type or form of processing unit capable of processing data or interpreting and executing instructions. In certain embodiments, processor 755 may receive instructions from a software application or module. These instructions may cause processor 755 to perform the functions of one or more of the embodiments described and/or illustrated herein. For example, processor 755 may perform and/or be a means for performing all or some of the operations described herein. Processor 755 may also perform and/or be a means for performing any other operations, methods, or processes described and/or illustrated herein. Memory 760 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 700 may include both a volatile memory unit and a non-volatile storage device. In one example, program instructions implementing dual-mode deduplication manager 125 may be loaded into memory 760.

In certain embodiments, computing system 700 may also include one or more components or elements in addition to processor 755 and/or memory 760. For example, as illustrated in FIG. 7, computing system 700 may include a memory controller 720, an Input/Output (I/O) controller 735, and a communication interface 745, each of which may be interconnected via a communication infrastructure 705. Communication infrastructure 705 generally represents any type or form of infrastructure capable of facilitating communication between one or more components of a computing device. Examples of communication infrastructure 705 include, without limitation, a communication bus (such as an Industry Standard Architecture (ISA), Peripheral Component Interconnect (PCI), PCI express (PCIe), or similar bus) and a network.

Memory controller 720 generally represents any type/form of device capable of handling memory or data or controlling communication between one or more components of computing system 700. In certain embodiments memory controller 720 may control communication between processor 755, memory 760, and I/O controller 735 via communication infrastructure 705. In certain embodiments, memory controller 720 may perform and/or be a means for performing, either alone or in combination with other elements, one or more of the operations or features described and/or illustrated herein.

I/O controller 735 generally represents any type or form of module capable of coordinating and/or controlling the input and output functions of an appliance and/or a computing device. For example, in certain embodiments I/O controller 735 may control or facilitate transfer of data between one or more elements of computing system 700, such as processor 755, memory 760, communication interface 745, display adapter 715, input interface 725, and storage interface 740.

Communication interface 745 broadly represents any type or form of communication device or adapter capable of facilitating communication between computing system 700 and one or more other devices. Communication interface 745 may facilitate communication between computing system 700 and a private or public network including additional computing systems. Examples of communication interface 745 include, without limitation, a wired network interface (such as a network interface card), a wireless network interface (such as a wireless network interface card), a modem, and any other suitable interface. Communication interface 745 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 745 may also represent a host adapter configured to facilitate communication between computing system 700 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 745 may also allow computing system 700 to engage in distributed or remote computing (e.g., by receiving/sending instructions to/from a remote device for execution).

As illustrated in FIG. 7, computing system 700 may also include at least one display device 710 coupled to communication infrastructure 705 via a display adapter 715. Display device 710 generally represents any type or form of device capable of visually displaying information forwarded by display adapter 715. Similarly, display adapter 715 generally represents any type or form of device configured to forward graphics, text, and other data from communication infrastructure 705 (or from a frame buffer, as known in the art) for display on display device 710. Computing system 700 may also include at least one input device 730 coupled to communication infrastructure 705 via an input interface 725. Input device 730 generally represents any type or form of input device capable of providing input, either computer or human generated, to computing system 700. Examples of input device 730 include a keyboard, a pointing device, a speech recognition device, or any other input device.

Computing system 700 may also include storage device 750 coupled to communication infrastructure 705 via a storage interface 740. Storage device 750 generally represents any type or form of storage devices or mediums capable of storing data and/or other computer-readable instructions. For example, storage device 750 may include a magnetic disk drive (e.g., a so-called hard drive), a floppy disk drive, a magnetic tape drive, an optical disk drive, a flash drive, or the like. Storage interface 740 generally represents any type or form of interface or device for transferring and/or transmitting data between storage device 750, and other components of computing system 700. Storage device 750 may be configured to read from and/or write to a removable storage unit configured to store computer software, data, or other computer-readable information. Examples of suitable removable storage units include a floppy disk, a magnetic tape, an optical disk, a flash memory device, or the like. Storage device 750 may also include other similar structures or devices for allowing computer software, data, or other computer-readable instructions to be loaded into computing system 700. For example, storage device 750 may be configured to read and write software, data, or other computer-readable information. Storage device 750 may also be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7. Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The computer-readable medium containing the computer program may be loaded into computing system 700. All or a portion of the computer program stored on the computer-readable medium may then be stored in memory 760 and/or various portions of storage device 750. When executed by processor 755, a computer program loaded into computing system 700 may cause processor 755 to perform and/or be a means for performing the functions of one or more of the embodiments described/illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments described and/or disclosed herein.

Example Networking Environment

Figure 8:
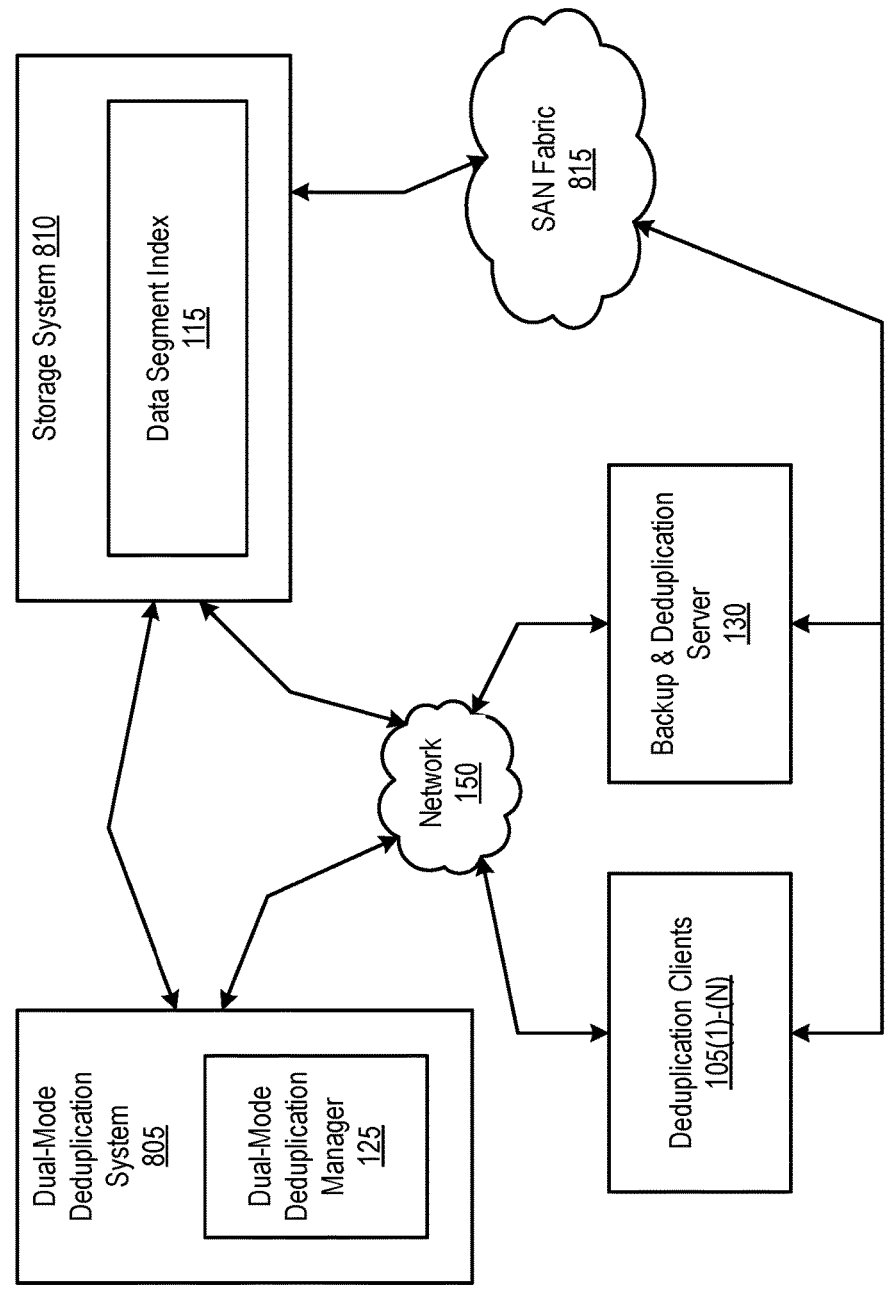
FIG. 8 is a block diagram of a networked system, illustrating how various computing entities can communicate via a network, according to one embodiment of the present disclosure.

FIG. 8 is a block diagram of a networked system, illustrating how various computing devices can communicate via a network, according to one embodiment. In certain embodiments, network-attached storage (NAS) devices may be configured to communicate with deduplication client 105 and backup and deduplication server 130 using Network File System (NFS), Server Message Block (SMB), or Common Internet File System (CIFS). Network 150 generally represents any type or form of computer network or architecture capable of facilitating communication between deduplication client 105 and backup and deduplication server 130.

In certain embodiments, a communication interface, such as communication interface 745 in FIG. 7, may be used to provide connectivity between deduplication client 105 and backup and deduplication server 130, and network 150. The embodiments described and/or illustrated herein are not limited to the Internet or any particular network-based environment.

In some embodiments, network 150 can be a Storage Area Network (SAN). In other embodiments, dual-mode deduplication manager 125 may be part of deduplication client 105, or may be separate. If separate, dual-mode deduplication manager 125 and deduplication client 105 may be communicatively coupled via network 150.

In one embodiment, all or a portion of one or more of the disclosed embodiments may be encoded as a computer program and loaded onto and executed by deduplication client 105 and/or dual-mode deduplication system 805, or any combination thereof. All or a portion of one or more of the embodiments disclosed herein may also be encoded as a computer program, stored on deduplication client 105 and/or dual-mode deduplication system 805, and distributed over network 150.

In some examples, all or a portion of deduplication client 105 and/or dual-mode deduplication system 805 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, dual-mode deduplication manager 125 may transform the behavior of deduplication client 105 and/or dual-mode deduplication system 805 in order to cause deduplication client 105 and/or dual-mode deduplication system 805 to perform dual-mode deduplication based on backup history.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   storing segment layout information of a backup image in a cache;
   receiving a data stream having a plurality of variable-length data segments;
   executing a fast mode of deduplication operations including,
      calculating a fingerprint of a variable-length data segment received in the data stream, wherein the length of the data segment corresponds to the length of a corresponding data segment defined in the cache,
      determining whether the calculated fingerprint of the variable-length data segment received in the data stream matches a fingerprint of the corresponding data segment in the cache,
      if the calculated fingerprint matches the fingerprint of the corresponding data segment in the cache, continuing to execute deduplication operations in the fast mode on subsequent data segments in the data stream so long as the calculated fingerprint of each variable-length data segment received in the data stream matches the fingerprint for the corresponding data segment in the cache;
   if it is determined that the calculated fingerprint of the variable-length data segment received in the data stream does not match the fingerprint for the corresponding data segment in the cache, executing a slow mode of deduplication operations, wherein the slow mode of deduplication operations include,
      calculating a new segment boundary for the data segment that does not match the fingerprint in the data stream using a rolling hash operation,
      calculating a new fingerprint for the data segment defined by the new segment boundary,
      continuing execution of the slow mode of deduplication operations on subsequent segments in the data stream until a fingerprint calculated based on a subsequent variable length data segment matches the fingerprint of a corresponding data segment in the cache; and
   returning to the execution of the fast mode of deduplication operations if it is determined that the fingerprint calculated based on a subsequent data segment matches the fingerprint for a corresponding data segment in the cache.

2. The computer-implemented method of claim 1, wherein
   the subsequent data segments in the data stream used in the fast mode of deduplication operations are adjacent to one another; and
   the subsequent data segments in the data stream used in the slow mode of deduplication operations are adjacent data segments having the new data segment boundary.

3. The computer-implemented method of claim 1, further comprising:
   retrieving data segment metadata associated with the backup image, wherein
      the backup image is maintained by a backup server,
      the backup image is a previous backup image, and
      the data segment metadata comprises fingerprints and respective data segment lengths.

4. The computer-implemented method of claim 1, further comprising:

deduplicating substantially all of the variable-length data segments of the data stream.

5. The computer-implemented method of claim 4, wherein
deduplication operations are executed in a dual-mode deduplication process including the fast mode of deduplication operations and the slow mode of deduplication operations, wherein
the fast mode of the dual-mode implements hashing of data in the data stream for calculating the fingerprints of the variable-length data segments, and
the slow mode of the dual-mode implements a rolling hashing of data in the data stream.

6. The computer-implemented method of claim 1, further comprising:
switching between the fast mode of deduplication operations and the slow mode of deduplication operations, and vice-versa, to implement dual-mode deduplication operations on the data stream.

7. The computer-implemented method of claim 1, wherein
the fast mode of deduplication operations utilizes segment length information from a previous backup image as a segment boundary to chunk a current data stream to compute one or more fingerprints of one or more data segments in the current data stream.

8. A non-transitory computer readable storage medium comprising program instructions executable to:
store segment layout information of a backup image in a cache;
receive a data stream having a plurality of variable length data segments;
execute a fast mode of deduplication operations including,
calculating a fingerprint of a variable-length data segment received in the data stream, wherein the length of the data segment corresponds to the length of a corresponding data segment defined in the cache,
determining whether the calculated fingerprint of the variable-length data segment matches a fingerprint of the corresponding data segment in the cache;
if the calculated fingerprint matches the fingerprint of the corresponding fingerprint in the cache, continuing execution of deduplication operations in the fast mode of deduplication operations on subsequent data segments in the data stream so long as the calculated fingerprint of each variable-length data segment received in the data stream matches the fingerprint of a corresponding data segment in the cache;
if it is determined that the calculated fingerprint of the variable-length data segment received in the data stream does not match the fingerprint for the corresponding data segment in the cache, executing a slow mode of deduplication operations, wherein the slow mode of deduplication operations include,
calculating a new segment boundary of the data segment that does not match the fingerprint in the data stream using a rolling hash operation,
calculating a new fingerprint for the data segment defined by the new segment boundary,
continue execution of the slow mode of deduplication operations on subsequent variable-length data segments in the data stream until a fingerprint calculated based on a subsequent variable length data segment matches a fingerprint of a corresponding data segment in the cache; and returning to the execution of the fast mode of deduplication operations if it is determined that the fingerprint calculated based on a subsequent data segment matches a fingerprint for a corresponding data segment in the cache.

9. The non-transitory computer readable storage medium of claim 8, wherein
the subsequent data segments in the data stream used in the fast mode of deduplication operations are adjacent to one another; and
the subsequent data segments in the data stream used in the slow mode of deduplication operations are adjacent data segments having the new data segment boundary.

10. The non-transitory computer readable storage medium of claim 8, further comprising:
retrieving data segment metadata associated with the backup image, wherein
the backup image is maintained by a backup server,
the backup image is a previous backup image, and
the data segment metadata comprises fingerprints and respective data segment lengths.

11. The non-transitory computer readable storage medium of claim 8, further comprising:
duplicating substantially all of the variable-length data segments of the data stream.

12. The non-transitory computer readable storage medium of claim 11, wherein
deduplication operations are executed in a dual-mode deduplication process including the fast mode of deduplication operations and the slow mode of deduplication operations, wherein
the fast mode of the dual-mode deduplication process implements hashing of data in the data stream for calculating the fingerprints of the variable-length data segments, and
the slow mode of the dual-mode deduplication process implements a rolling hash of data in the data stream.

13. A system comprising:
one or more processors; and
a memory coupled to the one or more processors, wherein the memory stores program instructions executable by the one or more processors to:
store segment layout information of a backup image in a cache;
receive a data stream having a plurality of variable length data segments;
execute a fast mode of deduplication operations including,
calculating a fingerprint of a variable-length data segment received in the data stream, wherein the variable-length corresponds to the length of a corresponding data segment defined in the cache;
determining whether the calculated fingerprint of the variable-length data segment matches a fingerprint of the corresponding data segment in the cache;
if the calculated fingerprint matches the fingerprint of the corresponding fingerprint in the cache, continuing to execute deduplication operations in the fast mode on subsequent data segments in the data stream so long as the calculated fingerprint of each variable-length data segment received in the data stream matches the fingerprint for the corresponding data segment in the cache;
if it is determined that the calculated fingerprint of the variable-length data segment received in the data stream does not match the fingerprint for the corresponding data segment in the cache, executing a slow mode of deduplication operations, wherein the slow mode of deduplication operations include, calculating a new segment boundary of the data segment that does not match the fingerprints in the data stream using a hash operation, calculating a new fingerprint for the data segment defined by the new segment boundary, continuing execution of the slow mode of deduplication operations on subsequent variable-length data segments in the data stream until a fingerprint calculated based on a subsequent variable length data segment matches a corresponding data segment in the cache; and returning to execution of the fast mode of deduplication operations if it is determined that the fingerprint calculated based on a subsequent data segment matches a fingerprint for a corresponding data segment in the cache.

14. The system of claim 13, wherein the subsequent data segments in the data stream used in the fast mode of deduplication operations are adjacent to one another; and the subsequent data segments in the data stream used in the slow mode of deduplication operations are adjacent data segments having the new data segment boundary.

15. The system of claim 14, further comprising:

deduplicating substantially all of the data segments of the data stream.

16. The system of claim 15, wherein the deduplication operations are executed in a dual-mode deduplication process including the fast mode of deduplication operations and the slow mode of de-duplication operations, wherein the fast mode of the dual-mode deduplication process implements hashing of data in the data stream, and the slow mode of the dual-mode deduplication process implements a rolling hash of data in the data stream.

* * * * *